United States Patent [19]

Ji et al.

[11] Patent Number: 5,701,192
[45] Date of Patent: Dec. 23, 1997

[54] THIN FILM ACTUATED MIRROR ARRAY AND METHOD OF MANUFACTURING THE SAME

[75] Inventors: Jeong-Beom Ji; Yong-Ki Min, both of Seoul, Rep. of Korea

[73] Assignee: Daewoo Electronics Co., Ltd., Seoul, Rep. of Korea

[21] Appl. No.: 639,581

[22] Filed: Apr. 29, 1996

[30] Foreign Application Priority Data

May 26, 1995 [KR] Rep. of Korea ............... 95-13358
May 26, 1995 [KR] Rep. of Korea ............... 95-13360

[51] Int. Cl.$^6$ ........................... G02B 26/08; G02B 7/182
[52] U.S. Cl. ................... 359/224; 359/291; 359/295; 359/846; 359/855; 359/900; 310/328; 310/366
[58] Field of Search ........................... 359/224, 223, 359/846–848, 849, 850, 855, 900, 291, 295; 310/328, 366; 29/25.35

[56] References Cited

U.S. PATENT DOCUMENTS

| | | | |
|---|---|---|---|
| 5,552,923 | 9/1996 | Min | 359/224 |
| 5,579,179 | 11/1996 | Ji et al. | 359/224 |
| 5,581,393 | 12/1996 | Min | 359/224 |
| 5,585,956 | 12/1996 | Lee et al. | 359/224 |
| 5,604,623 | 2/1997 | Ji et al. | 359/224 |
| 5,608,569 | 3/1997 | Kim | 359/224 |

*Primary Examiner*—James Phan
*Attorney, Agent, or Firm*—Anderson Kill & Olick, P.C.

[57] ABSTRACT

An array of thin film actuated mirrors includes an active matrix and an array of actuating structures, each of the actuating structures including an elastic member, a pair of conduits, a second thin film electrode with a stripe, a thin film electrodisplacive member and a first thin film electrode. Furthermore, a method for the manufacture of the array of thin film actuated mirrors includes the steps of: providing an active matrix; depositing a thin film sacrificial layer; creating an array of pairs of empty slots in the thin film sacrificial layer; depositing an elastic layer; forming an array of conduits in the elastic layer; depositing a second thin film layer; creating stripes on the second thin film layer; depositing a thin film electrodisplacive and a first thin film layers; patterning the first thin film, the thin film electrodisplacive, the second thin film and the elastic layers, thereby forming an array of actuated mirror structures; forming a thin film protection layer; removing the thin film sacrificial layer; and removing the thin film protection layer, thereby forming the array of thin film actuated mirrors.

15 Claims, 9 Drawing Sheets

THIN FILM ACTUATED MIRROR ARRAY AND METHOD OF MANUFACTURING THE SAME

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

Figure 1A:
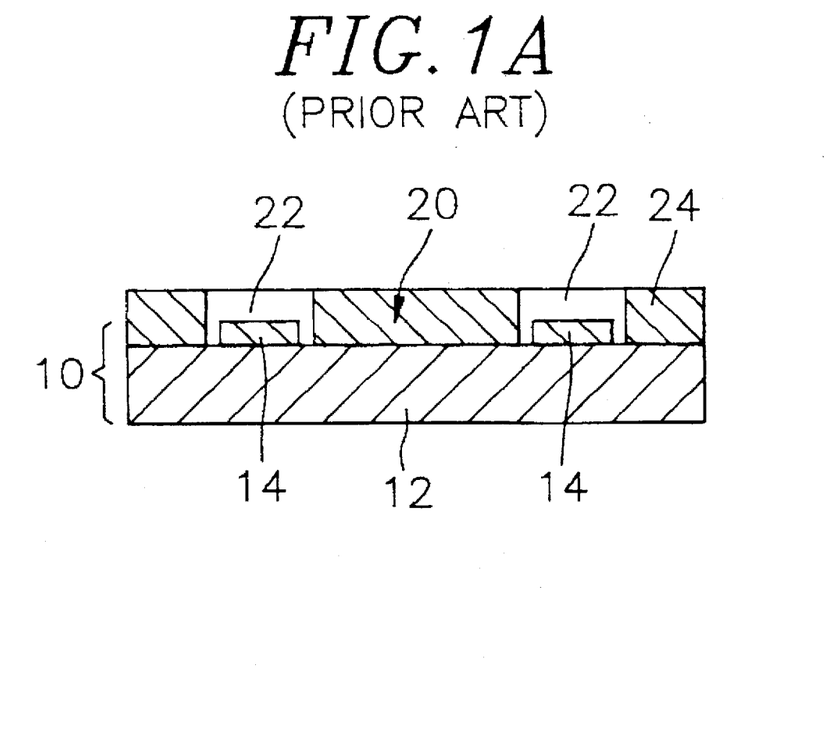
FIGS. 1A to 1G are schematic cross sectional views illustrating a method for the manufacture of an array of M×N thin film actuated mirrors previously disclosed.

The process for manufacturing the array 100 begins with the preparation of an active matrix 10 having a top surface and comprising a substrate 12, an array of M×N transistors (not shown) and an array of M×N connecting terminals 14.

In a subsequent step, there is formed on the top surface of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

Figure 1B:
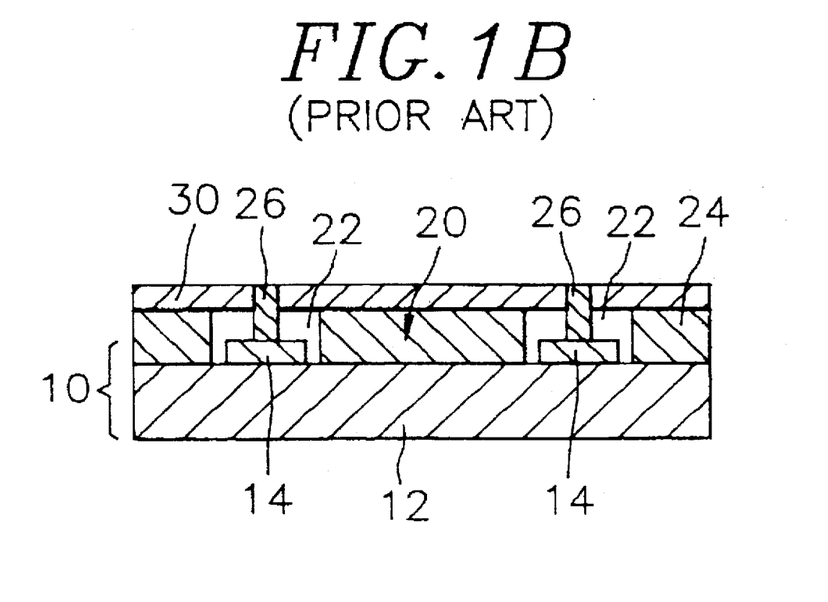

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

Figure 1C:
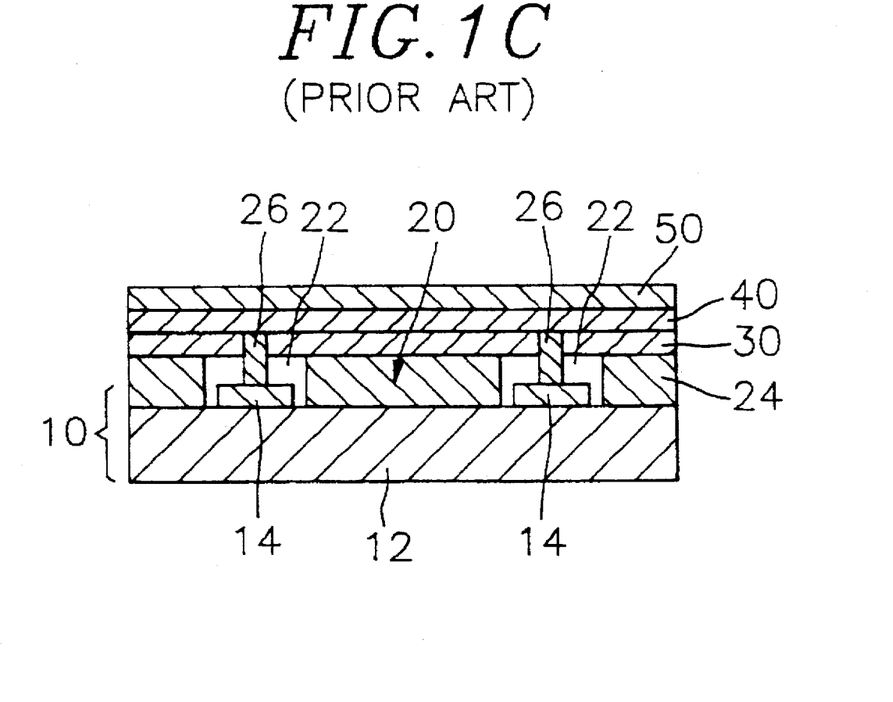

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate (PZT), is formed on top of the second thin film layer 40 by using a sputtering method, a CVD method or a Sol-Gel method, as shown in FIG. 1C.

Figure 1D:
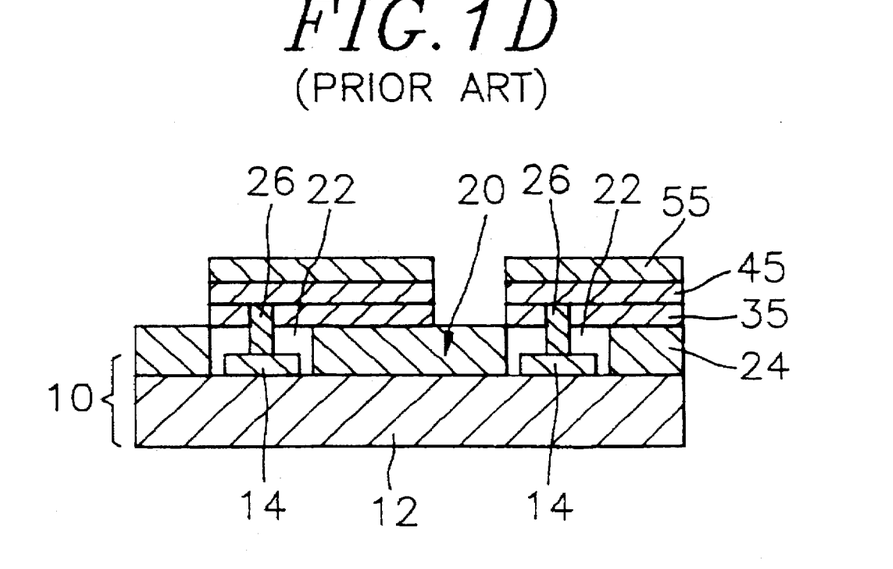

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the supporting layer 20 is exposed, as shown in FIG. 1D. Each of the second thin film electrodes 45 is electrically connected to the transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

Figure 1E:
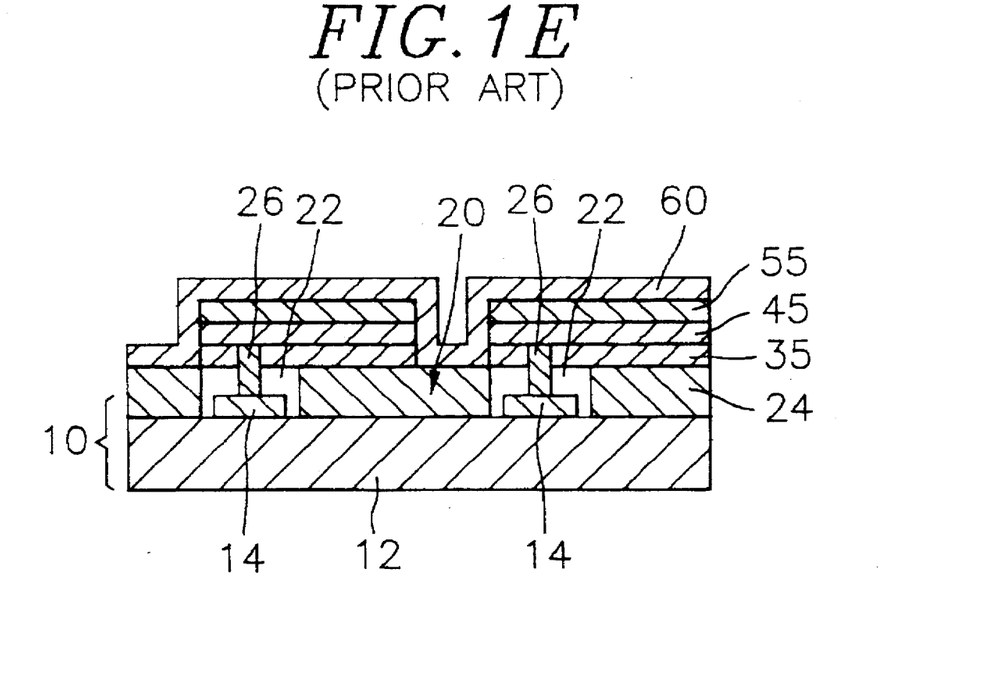
Figure 1F:
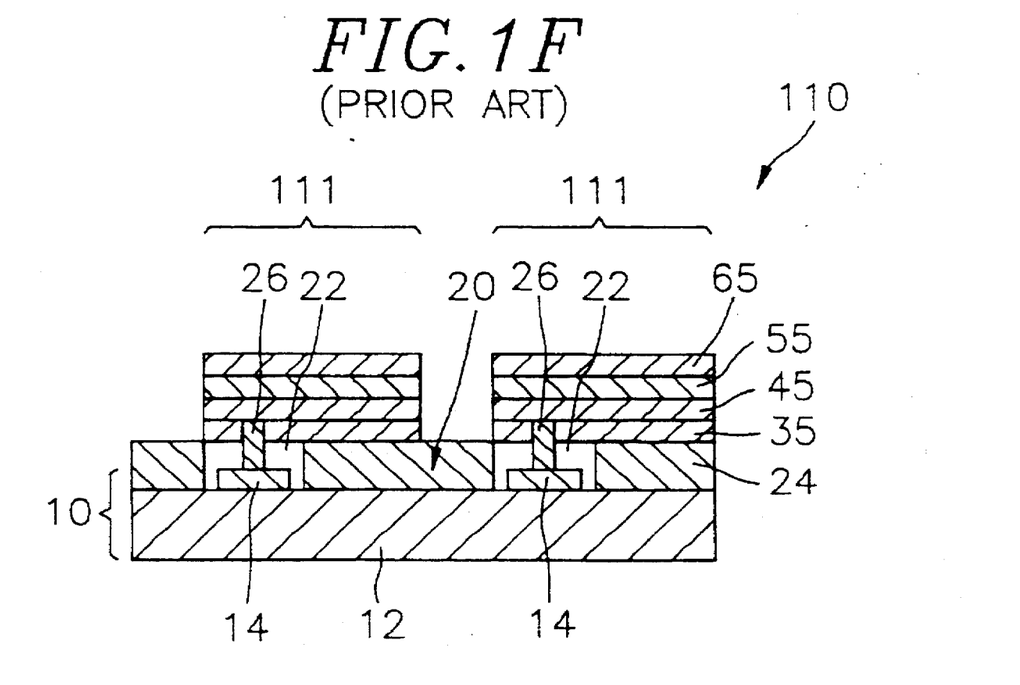

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer (not shown).

Figure 1G:
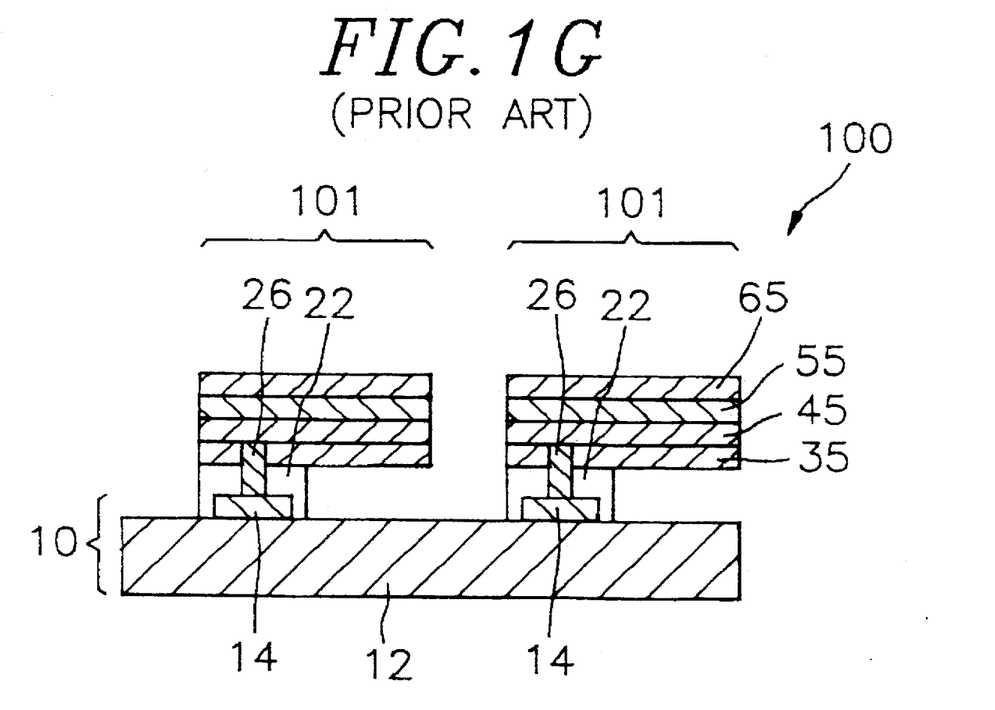

The thin film sacrificial layer 24 in the supporting layer 20 is then removed by using an wet etching method. Finally, the thin film protection layer is removed to thereby form the array 100 of M×N thin film actuated mirrors 101, as shown in FIG. 1G.

There are certain deficiencies associated with the above described array 100 and the method for the manufacture thereof. The first and foremost is the reduction in the optical efficiency of the array 100 due to the stress developed between the thin film electrodisplacive member 55 and the elastic member 35 in each of the thin film actuated mirrors 101 during the operation thereof. The stress developed therebetween will cause cracks to be formed on the first thin film electrode 65 or will even in some cases force the first thin film electrode 65 to be peeled off from each of the thin film actuated mirrors 101. Furthermore, the stress will force the thin film electrodisplacive member 55, and hence the first thin film electrode 65 attached on top thereof, to bend in an irregular manner, contributing to the reduction of the overall optical efficiency of the array 100.

SUMMARY OF THE INVENTION

It is, therefore, a primary object of the present invention to provide an array of M×N thin film actuated mirrors for use in an optical projection system, wherein each of the thin film actuated mirrors is capable of relieving the stress developed between the thin film electrodisplacive member and the elastic member.

It is another object of the present invention to provide a method for the manufacture of such an array of M×N thin film actuated mirrors.

In accordance with one aspect of the present invention, there is provided an array of M×N thin film actuated mirrors, wherein M and N are integers, for use in an optical projection system, the array comprising: an active matrix including a substrate with an array of M×N pairs of connecting terminals and an array of M×N transistors, wherein the connecting terminals in each pair are electrically connected to a corresponding transistor in the array of transistors; and an array of M×N actuating structures, each of the actuating structures having an actuating and a light reflecting portions, and including an elastic member, a pair of conduits, a second thin film electrode divided into two portions by a stripe, a thin film electrodisplacive member and a first thin film electrode, the first and the second thin film electrodes being placed on top and bottom of the thin film electrodisplacive member, respectively, the elastic member being placed below the second thin film electrode, wherein the two portions defined by the stripe in the second thin film electrode correspond to the actuating and the light reflecting portions in each of the actuating structures, respectively, the portion of the second thin film electrode corresponding to the actuating portion in each of the actuating structures is electrically connected to the transistor through the conduits and the connecting terminals, thereby functioning as a signal electrode in each of the actuating structures, and the first thin film electrode functions as a mirror and a bias electrode in each of the actuating structures.

In accordance with another aspect of the present invention, there is provided a method for the manufacture of the array of M×N thin film actuated mirrors for use in an optical projection system, the method comprising the steps of: providing an active matrix including a substrate with an array of M×N pairs of connecting terminals and an array of M×N transistors, wherein the connecting terminals in each pair are electrically connected to a corresponding transistor in the array of transistors; depositing a thin film sacrificial layer on top of the active matrix; creating an array of M×N pairs of empty slots in the thin film sacrificial layer, each of the empty slots in the pair being located around top of the connecting terminal; depositing an elastic layer, made of an insulating material, on top of the thin film sacrificial layer including the empty slots; forming an array of M×N pairs of conduits in the elastic layer, each of the conduits in the pair extending from top of the elastic layer to top of the connecting terminal; forming a second thin film layer, made of an electrically conducting material, on top of the elastic layer including the conduits; creating a plurality of parallel identically spaced stripes on the second thin film layer, wherein the stripes expose the elastic layer to thereby define the second thin film layer into a corresponding number of physically separated regions; depositing a thin film electrodisplacive and a first thin film layers, successively, on top of the second thin film layer, wherein the first thin film layer is made of an electrically conducting and light reflecting material; patterning the first thin film, the thin film electrodisplacive, the second thin film and the elastic layers, until the thin film sacrificial layer is exposed, thereby forming an array of M×N actuated mirror structures, each of the actuated mirror structures including a first thin film electrode, a thin film electrodisplacive member, a second thin film electrode with the stripe and an elastic member with the conduits; forming a thin film protection layer completely covering each of the actuated mirror structures; removing the thin film sacrificial layer; and removing the thin film protection layer, thereby forming the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

There are provided in FIGS. 2 and 3A to 3F a cross sectional view of an array 300 of M×N thin film actuated mirrors 301, wherein M and N are integers, for use in an optical projection system and schematic cross sectional views setting forth a method for the manufacture of the array 300 of M×N thin film actuated mirrors 301, respectively, in accordance with the present invention. It should be noted that like parts appearing in FIGS. 2 and 3A to 3F are represented by like reference numerals.

Figure 2:
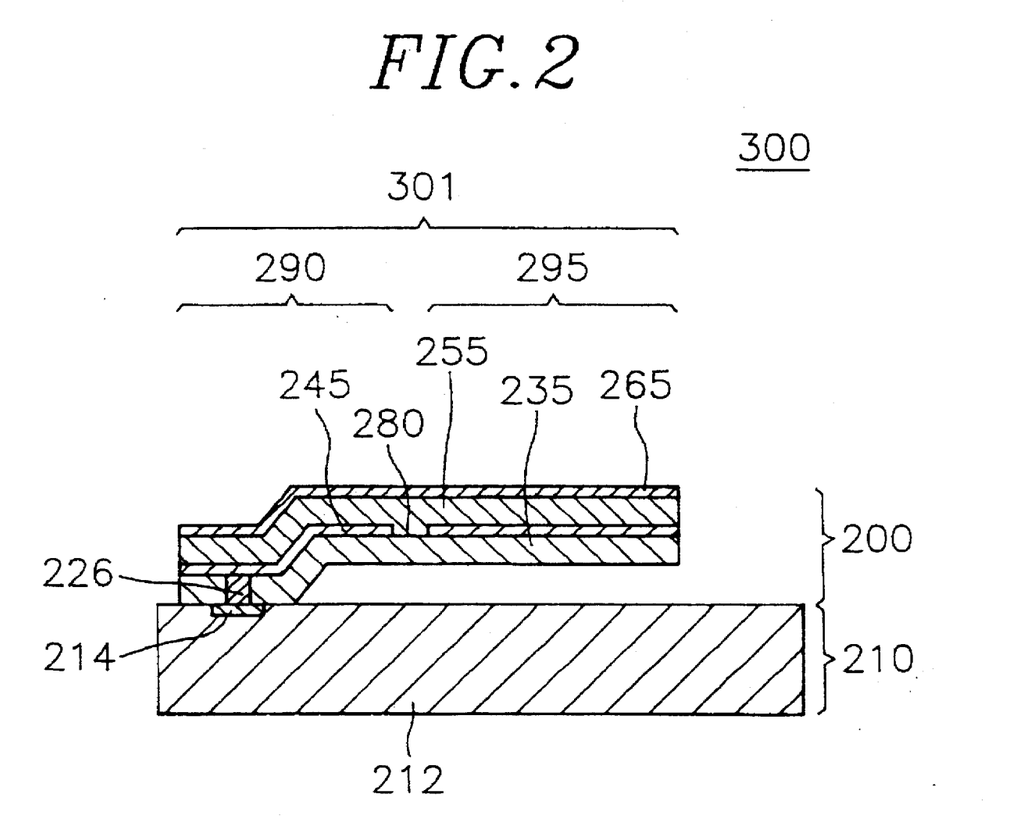
FIG. 2 is a cross sectional view of an array of M×N thin film actuated mirrors in accordance with the present invention.

In FIG. 2, there is provided a cross sectional view of an array 300 of M×N thin film actuated mirrors 301 in accordance with the present invention, the array 300 including an active matrix 210 and an array of M×N actuating structures 200.

The active matrix 210 includes a substrate 212 with an array of M×N pairs of connecting terminals 214 and an array of M×N transistors (not shown). The connecting terminals 214 in each pair are electrically connected to a corresponding transistor in the array of transistors.

Each of the actuating structures 200 is provided with an actuating and a light reflecting portions 290, 295, and includes an elastic member 235, a pair of conduits 226, a second thin film electrode 245 with a stripe 280, a thin film electrodisplacive member 255 and a first thin film electrode 265. The thin film electrodisplacive member 255 is made of a piezoelectric material, e.g., lead zirconium titanate (PZT), or an electrostrictive material, e.g., lead magnesium niobate (PMN), and has a thickness of 0.1–2 μm. The first thin film electrode 265, made of an electrically conducting and light reflecting material, and having a thickness of 0.1–2 μm, is placed on top of the thin film electrodisplacive member 255. The second thin film electrode 245, made of an electrically conducting material, and having a thickness of 0.1–2 μm, is formed on bottom of the thin film electrodisplacive member 255. The elastic member 235, made of an insulating material, and having a thickness of 0.1–2 μm, is placed below the second thin film electrode 245. The stripe 280 defines the second thin film electrode 245 into two portions, wherein the two portions of the second thin film electrode 245 correspond to the actuating and the light reflecting portions 290, 295 in each of the actuating structures 200, respectively. The portion of the second thin film electrode 245 corresponding to the actuating portion 290 in each of the actuating structures 200 is electrically connected to the transistor through the conduits 226 and the connecting terminals 214, thereby allowing it to function as a signal electrode in each of the actuating structures 200. The first thin film electrode 265 functions as a mirror as well as a bias electrode in each of the actuating structures 200.

In FIGS. 3A to 3F, there are provided schematic cross sectional views setting forth a method for the manufacture of the array 300 of M×N thin film actuated mirrors 301 shown in FIG. 2.

Figure 3A:
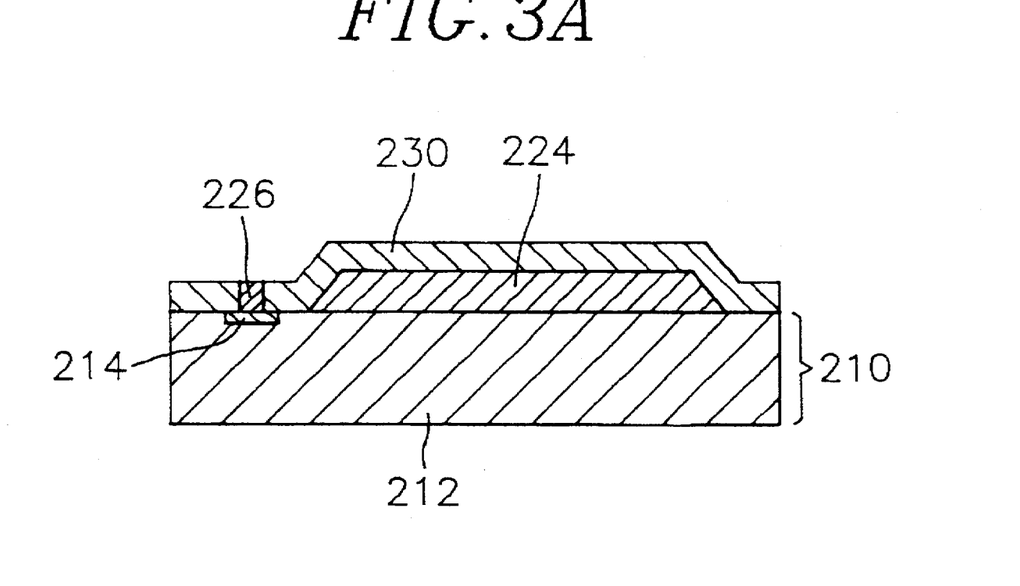
FIGS. 3A to 3F are schematic cross sectional views setting forth a method for the manufacture of the array of M×N thin film actuated mirrors shown in FIG. 2.

The process for the manufacture of the array 300 begins with the preparation of an active matrix 210 including a substrate 212 with an array of M×N pairs of connecting terminals 214 and an array of M×N transistors (not shown), wherein the connecting terminals 214 in each pair are electrically connected to a corresponding transistor in the array of transistors.

In a subsequent step, there is formed on top of the active matrix 210 a thin film sacrificial layer 224, having a thickness of 0.1–2 μm, and made of a metal, e.g., copper (Cu) or nickel (Ni), a phosphor-silicate glass (PSG) or a poly-Si. The thin film sacrificial layer 224 is formed by using a sputtering or an evaporation method if the thin film sacrificial layer 224 is made of a metal, a chemical vapor deposition (CVD) method or a spin coating method if the thin film sacrificial layer 224 is made of a PSG, or a CVD method if the thin film sacrificial layer 224 is made of a poly-Si.

Next, there is formed an array of M×N pairs of empty slots (not shown) in the thin film sacrificial layer 224 by using a photolithography method. Each of the empty slots in the pair is located around top of the connecting terminal 214.

Subsequently, an elastic layer 230, made of an insulating material, e.g., silicon nitride or silicon carbide, and having a thickness of 0.1–2 μm, is deposited on top of the thin film sacrificial layer 224 including the empty slots by using an evaporation method or a sputtering method.

Thereafter, there is formed in the elastic layer 230 an array of M×N pairs of conduits 226 made of a metal, e.g., aluminum (Al). Each of the conduits 226 is formed by: first creating an array of M×N pairs of holes (not shown), each of the holes extending from top of the elastic layer 230 to top of the connecting terminal 214 by using an etching method; and filling therein with the metal by using a sputtering method, as shown in FIG. 3A.

Figure 3B:
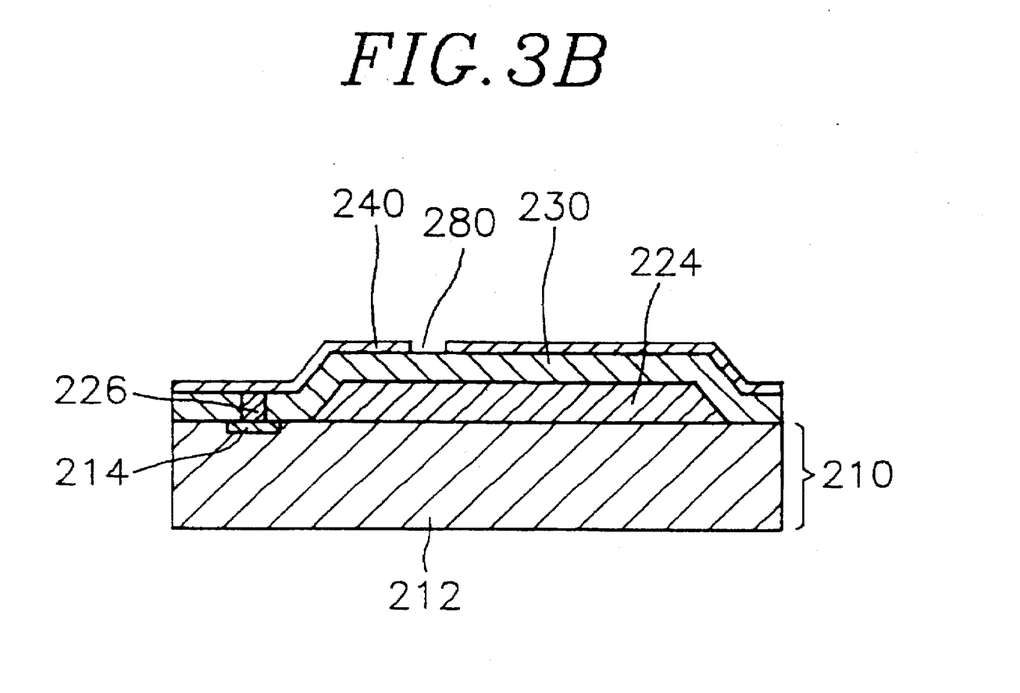

In a following step, a second thin film layer 20, made of an electrically conducting material, e.g., platinum (Pt) or platinum/titanium (Pt/Ti), and having a thickness of 0.1–2 μm, is formed on top of the elastic layer 230 including the conduits 226 by using a sputtering or a vacuum evaporation method.

Then, a plurality of parallel identically spaced stripes 280 are created on the second thin film layer 240 by using an etching method, as shown in FIG. 3B, wherein the stripes 280 expose the elastic layer 230 to thereby define the second thin film layer 240 into a corresponding number of physically separated regions.

Figure 3C:
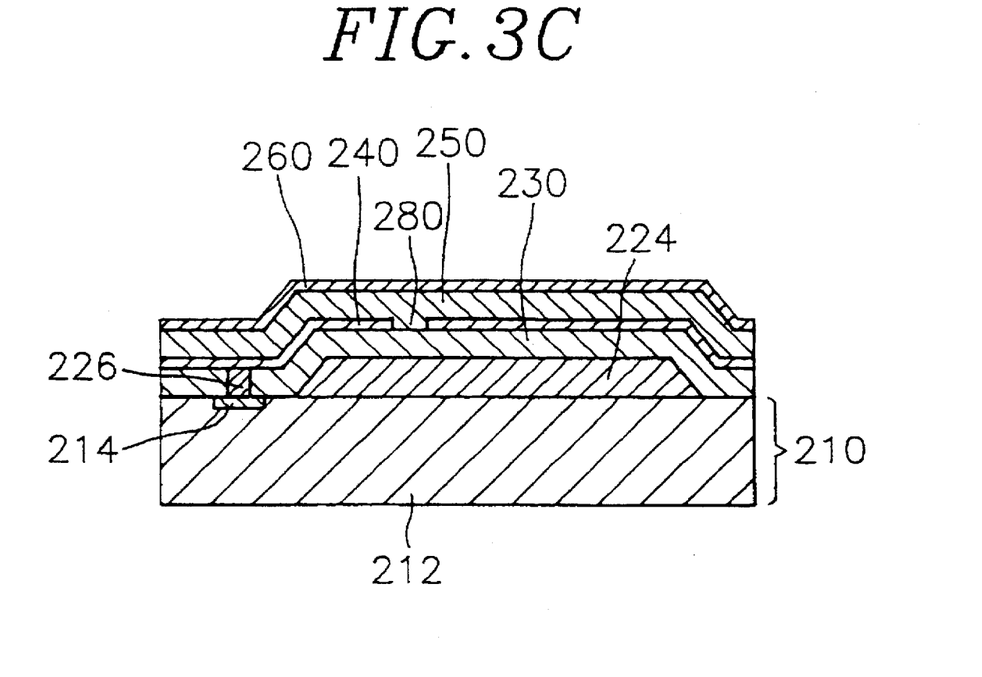

Next, a thin film electrodisplacive layer 250, made of a piezoelectric material, e.g., lead zirconium titanate (PZT), or an electrostrictive material, e.g., lead magnesium niobate (PMN), and having a thickness of 0.1–2 μm, is formed on top of the second thin film layer 240 by using an evaporation method or a sputtering method. The thin film electrodisplacive layer 250 is then heat treated to allow a phase transition to take place.

In an ensuing step, a first thin film layer 260, made of an electrically conducting and light reflecting material, e.g., aluminum (Al) or silver (Ag), and having a thickness of 0.1–2 μm, is formed on top of the thin film electrodisplacive layer 250 by using a sputtering or a vacuum evaporation method, as shown in FIG. 3C.

Figure 3D:
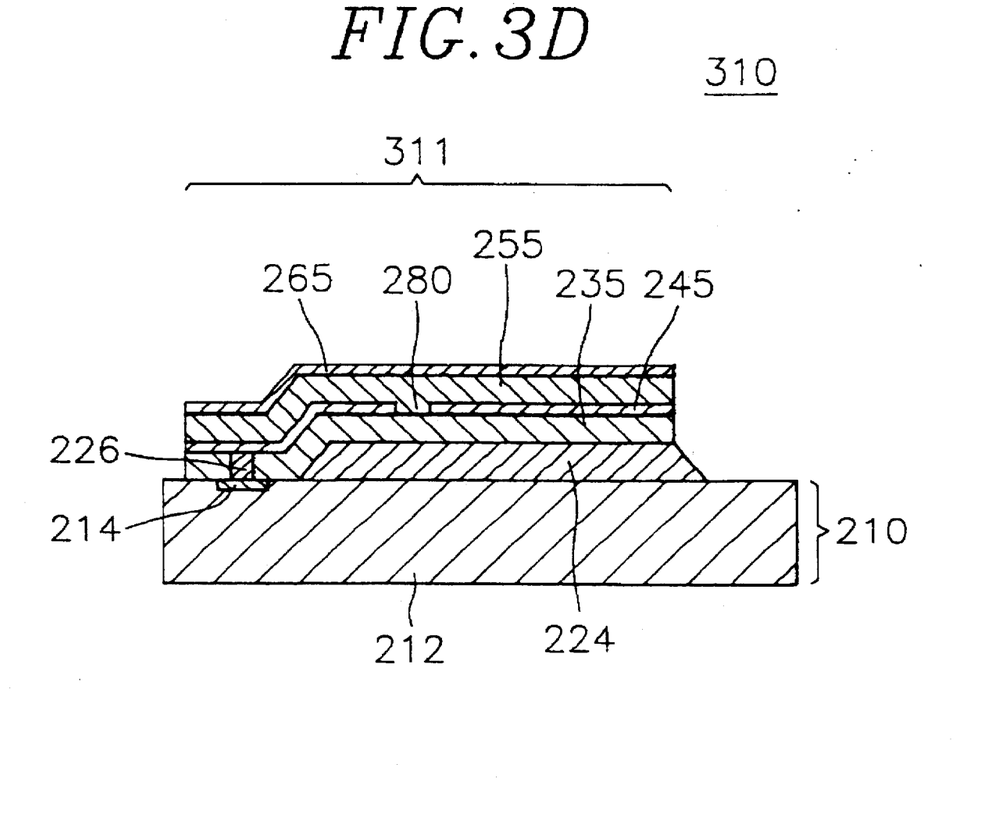

After the above step, the first thin film 260, the thin film electrodisplacive 250, the second thin film 240 and the elastic layers 230 are patterned, until the thin film sacrificial layer 224 is exposed, by using a photolithography or a laser trimming method, thereby forming an array 310 of M×N actuated mirror structures 311, each of the actuated mirror structures 311 having a first thin film electrode 265, a thin film electrodisplacive member 255, a second thin film electrode 245 with the stripe 280 and an elastic member 235 with the conduits 226, as shown in FIG. 3D. Each of the second thin film electrodes 245 is electrically connected to the transistor through the conduits 226 and the connecting terminals 214.

Since each of the thin film electrodisplacive members 255 is sufficiently thin, there is no need to pole it in case it is made of a piezoelectric material: for it can be poled with the electric signal applied during the operation of the thin film actuated mirrors 301.

Figure 3E:
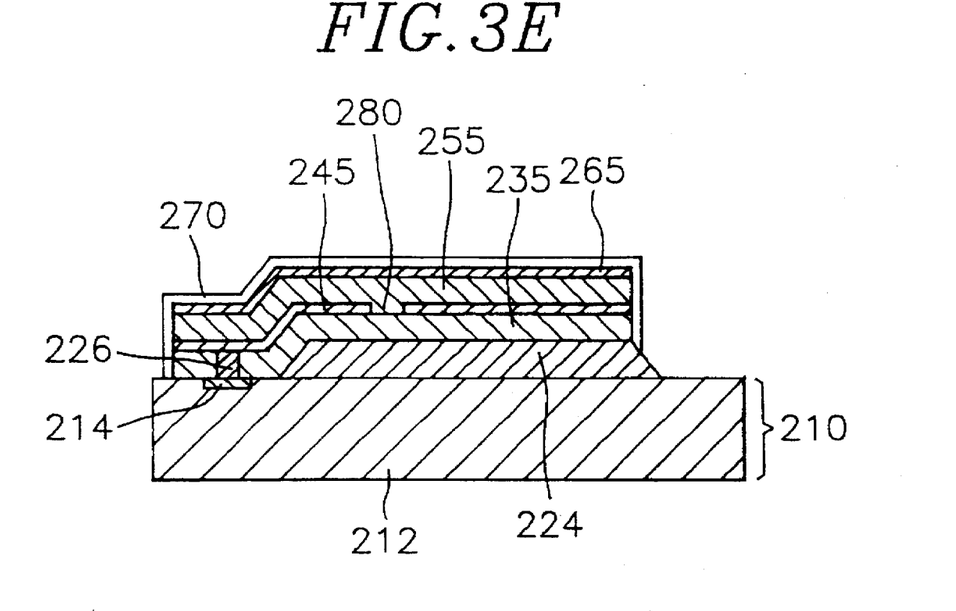

The preceeding step is then followed by completely covering each of the actuated mirror structures 311 with a thin film protection layer 270, as shown in FIG. 3E.

Figure 3F:
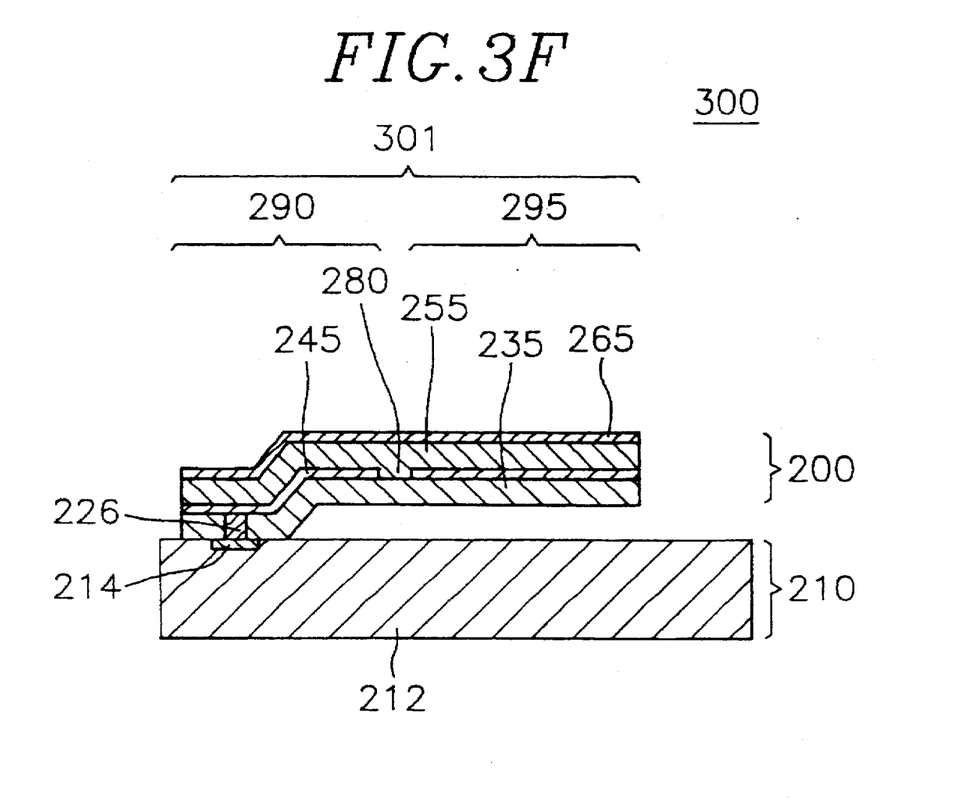

The thin film sacrificial layer 224 is then removed by using an etching method. Finally, the thin film protection layer 270 is removed, thereby forming the array 300 of M×N thin film actuated mirrors 301, as shown in FIG. 3F.

Figure 4:
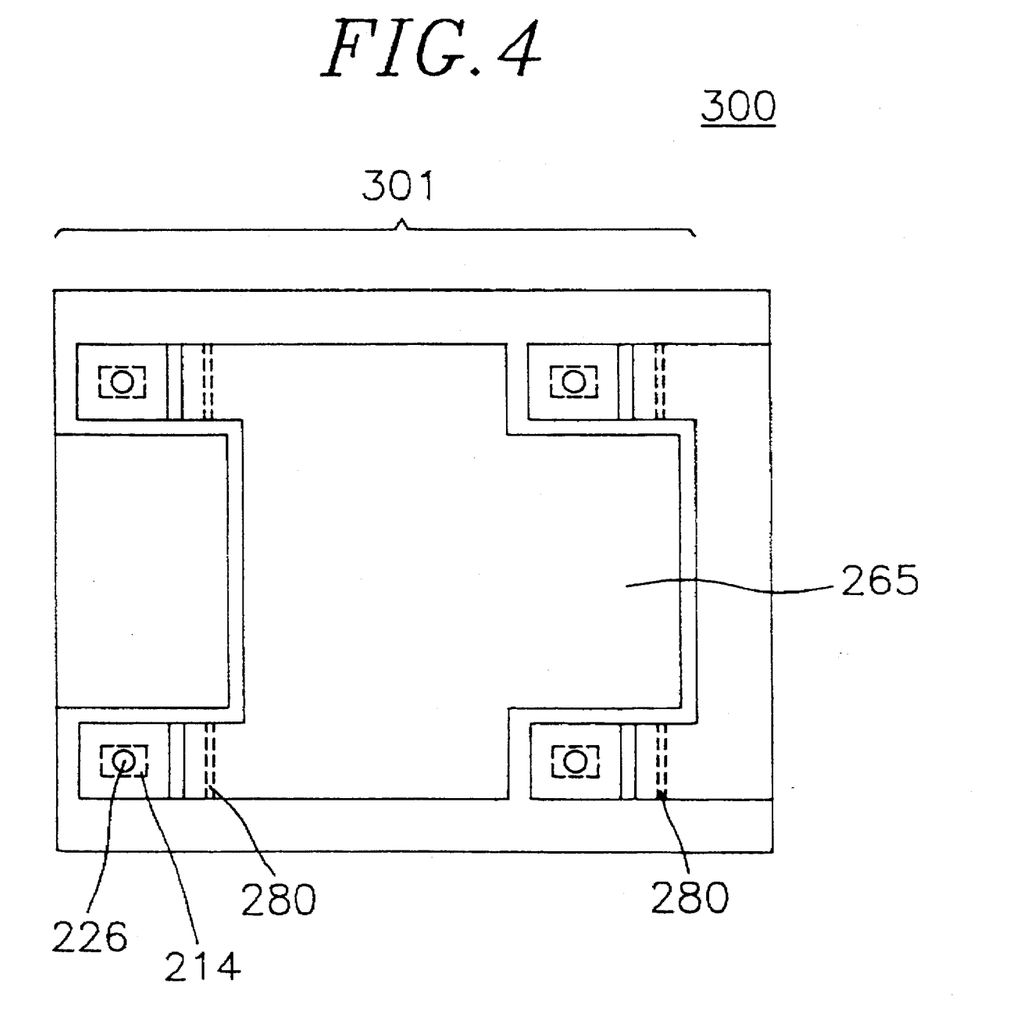
FIG. 4 is a top view of the array of M×N thin film actuated mirrors in accordance with the present invention.

In FIG. 4, there is provided a top view of the array 300 of M×N thin film actuated mirrors 301 in accordance with the present invention.

In the inventive array 300 of the M×N thin film actuated mirrors 301 and the method for the manufacture thereof, since the stripe 280 defines the second thin film electrode 245 into the two portions which correspond to the actuating and the light reflecting portions 290, 295 in each of the actuating structures 200, respectively, a deformation occurs only in the actuating portion 290 in each of the actuating structures 200 during the operation of each of the thin film actuated mirrors 301. The light reflecting portion 295 in each of the actuating structures 200 remains, therefore, flat, reducing the stress between the thin film electrodisplacive member 255 and the elastic member 235, thereby increasing the overall optical efficiency of the array 300.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate with an array of M×N pairs of connecting terminals and an array of M×N transistors, wherein the connecting terminals in each pair are electrically connected to a corresponding transistor in the array of transistors; and an array of M×N actuating structures, each of the actuating structures having an actuating and a light reflecting portions, and including an elastic member, a pair of conduits, a second thin film electrode divided into two portions by a stripe, a thin film electrodisplacive member and a first thin film electrode, the first and the second thin film electrodes being placed on top and bottom of the thin film electrodisplacive member, respectively, the elastic member being placed below the second thin film electrode, wherein the two portions defined by the stripe in the second thin film electrode correspond to the actuating and the light reflecting portions in each of the actuating structures, respectively, the portion of the second thin film electrode corresponding to the actuating portion in each of the actuating structures is electrically connected to the transistor through the conduits and the connecting terminals, thereby functioning as a signal electrode in each of the actuating structures, and the first thin film electrode functions as a mirror and a bias electrode in each of the actuating structures.

2. The method of claim 1, wherein the thin film electrodisplacive member has a thickness of 0.1–2 μm.

3. The method of claim 1, wherein the first thin film electrode has a thickness of 0.1–2 μm.

4. The method of claim 1, wherein the second thin film electrode has a thickness of 0.1–2 μm.

5. The method of claim 1, wherein the elastic member has a thickness of 0.1–2 μm.

6. A method for the manufacture of the array of M×N thin film actuated mirrors for use in an optical projection system, the method comprising the steps of:

providing an active matrix including a substrate with an array of M×N pairs of connecting terminals and an array of M×N transistors, wherein the connecting terminals in each pair are electrically connected to a corresponding transistor in the array of transistors;

depositing a thin film sacrificial layer on top of the active matrix;

creating an array of M×N pairs of empty slots in the thin film sacrificial layer, each of the empty slots in the pair being located around top of the connecting terminal;

depositing an elastic layer, made of an insulating material, on top of the thin film sacrificial layer including the empty slots;

forming an array of M×N pairs of conduits in the elastic layer, each of the conduits in the pair extending from top of the elastic layer to top of the connecting terminal;

forming a second thin film layer, made of an electrically conducting material, on top of the elastic layer including the conduits;

creating a plurality of parallel identically spaced stripes on the second thin film layer, wherein the stripes expose the elastic layer to thereby define the second thin film layer into a corresponding number of physically separated regions;

depositing a thin film electrodisplacive and a first thin film layers, successively, on top of the second thin film layer, wherein the first thin film layer is made of an electrically conducting and light reflecting material;

patterning the first thin film, the thin film electrodisplacive, the second thin film and the elastic layers, until the thin film sacrificial layer is exposed, thereby forming an array of M×N actuated mirror structures, each of the actuated mirror structures including a first thin film electrode, a thin film electrodisplacive member, a second thin film electrode with the stripe and an elastic member with the conduits;

forming a thin film protection layer completely covering each of the actuated mirror structures;

removing the thin film sacrificial layer; and removing the thin film protection layer, thereby forming the array of M×N thin film actuated mirrors.

7. The method of claim 6, wherein the thin film sacrificial layer is formed by using a sputtering or an evaporation method if the thin film sacrificial layer is made of a metal, a chemical vapor deposition (CVD) method or a spin coating method if the thin film sacrificial layer is made of a PSG, or a CVD method if the thin film sacrificial layer is made of a poly-Si.

8. The method of claim 6, wherein the elastic layer is made of a silicon nitride or a silicon carbide.

9. The method of claim 6, wherein the elastic layer is formed by using an evaporation method or a sputtering method.

10. The method of claim 6, wherein the second thin film layer is made of platinum (Pt) or platinum/titanium (Pt/Ti).

11. The method of claim 6, wherein the second thin film layer is formed by using a sputtering or a vacuum evaporation method.

12. The method of claim 6, wherein the thin film electrodisplacive layer is made of a piezoelectric material or an electrostrictive material.

13. The method of claim 6, wherein the thin film electrodisplacive layer is formed by using an evaporation method or a sputtering method.

14. The method of claim 6, wherein the first thin film layer is made of aluminum (Al) or silver (Ag).

15. The method of claim 6, wherein the first thin film layer is formed by using a sputtering or a vacuum evaporation method.

* * * * *